United States Patent
Khodari et al.

(10) Patent No.: US 10,118,180 B2
(45) Date of Patent: Nov. 6, 2018

(54) SHAFT DRIVE COUPLING AND METHOD OF RELEASING

(71) Applicant: Eaton Intelligent Power Limited, Dublin (IE)

(72) Inventors: Ahmed Shaaban Khodari, Parma Heights, OH (US); Donald Alan Keck, Brea, CA (US)

(73) Assignee: Eaton Intelligent Power Limited, Dublin (IE)

( * ) Notice: Subject to any disclaimer, the term of this patent is extended or adjusted under 35 U.S.C. 154(b) by 656 days.

(21) Appl. No.: 14/739,247

(22) Filed: Jun. 15, 2015

(65) Prior Publication Data

US 2016/0363174 A1 Dec. 15, 2016

(51) Int. Cl.
| | |
|---|---|
| *F16D 25/04* | (2006.01) |
| *B02C 25/00* | (2006.01) |
| *F16D 48/06* | (2006.01) |
| *B02C 17/24* | (2006.01) |

(52) U.S. Cl.
CPC .............. *B02C 25/00* (2013.01); *B02C 17/24* (2013.01); *F16D 25/046* (2013.01); *F16D 48/06* (2013.01); *F16D 2300/02* (2013.01); *F16D 2300/18* (2013.01); *F16D 2500/1045* (2013.01); *F16D 2500/30415* (2013.01); *F16D 2500/30426* (2013.01)

(58) Field of Classification Search
CPC ..................................................... F16D 25/046
See application file for complete search history.

(56) References Cited

U.S. PATENT DOCUMENTS

| | | | | |
|---|---|---|---|---|
| 2,870,891 A | * | 1/1959 | Eakin | F16D 25/046 188/152 |
| 3,777,868 A | * | 12/1973 | Sugahara | F16D 25/046 188/367 |
| 4,190,136 A | * | 2/1980 | Collins | F16D 25/046 188/250 G |
| 4,635,769 A | | 1/1987 | de Hertel Eastcott | |
| 5,020,649 A | * | 6/1991 | Eastcott | F16D 25/046 192/48.1 |
| 7,467,038 B2 | * | 12/2008 | Doebele | B60W 30/18 477/70 |
| 8,967,356 B2 | * | 3/2015 | Boonpongmanee | F16D 25/046 192/85.13 |

FOREIGN PATENT DOCUMENTS

EP 0 144 527 A2 6/1985

* cited by examiner

*Primary Examiner* — Robert W Hodge
*Assistant Examiner* — Ryan P Dodd
(74) *Attorney, Agent, or Firm* — Fay Sharpe LLP

(57) ABSTRACT

A releasable pneumatically operated coupling for an industrial drive such as for a grinding mill. A variable speed motor has its output shaft provided with a flange rotating therewith on which are mounted a plurality of radially moveable arcuate elements having friction pads on their radially inner surfaces. An inflatable ring surrounds the arcuate elements and, upon inflation, urges the pads into driving contact with an annular friction surface on a coupling output shaft. The arcuate elements have U-shaped undercuts in the axial torque bar passages therethrough for stress relief. Separate speed sensors on the motor shaft and coupling output shaft provide signals to a comparator which, upon sensing a predetermined speed difference, provide a signal to an electrically operated valve which exhausts air pressure from the inflatable ring to release the coupling.

8 Claims, 5 Drawing Sheets

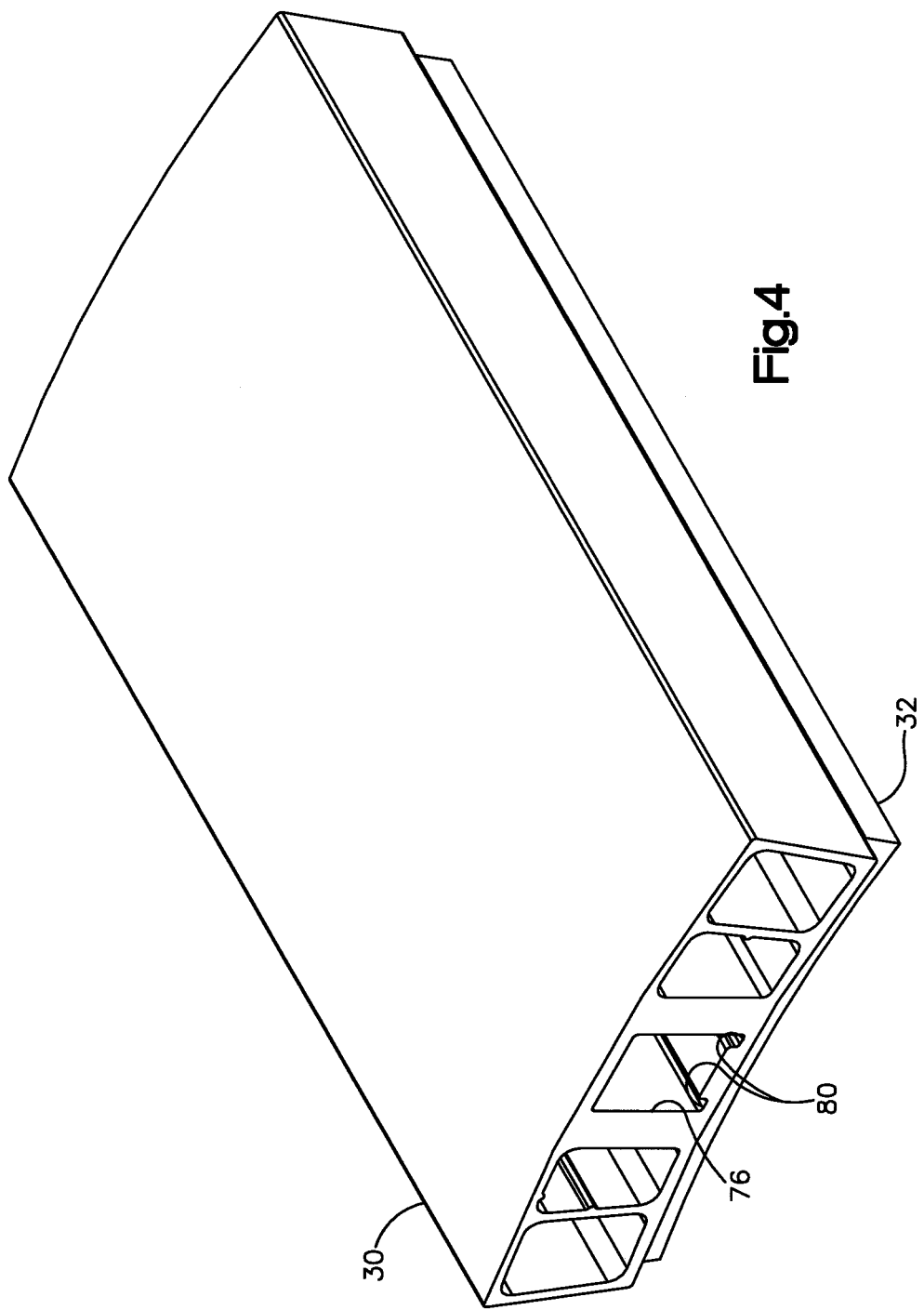

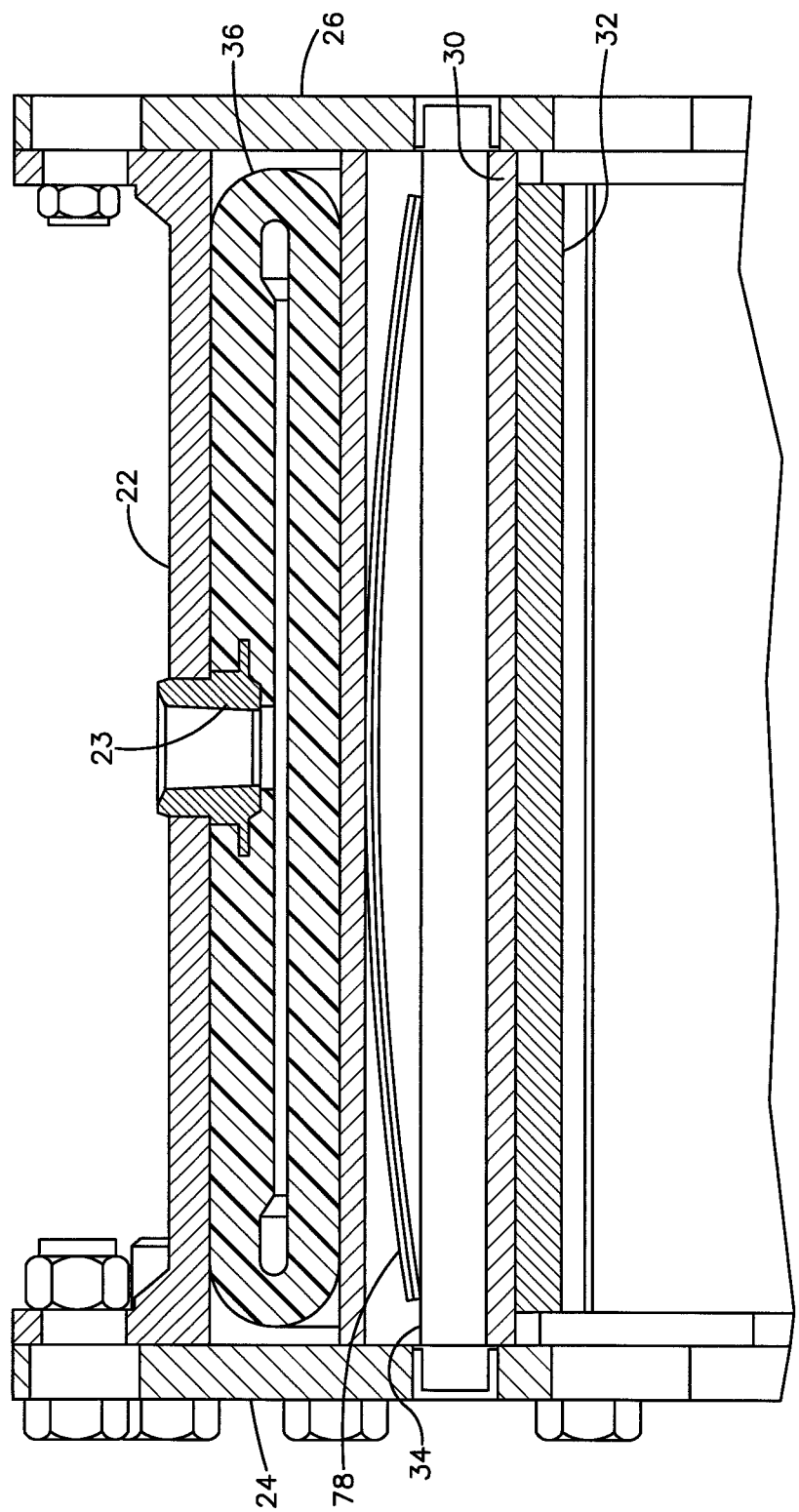

SHAFT DRIVE COUPLING AND METHOD OF RELEASING

BACKGROUND

The present disclosure relates to industrial shaft drives and particularly shaft drives for grinding mills employing relatively large drive motors in the range of 4,000 to 15,000HP and capable of sustaining drive torque in excess of 1,000,000 foot pounds (1,350,000 newton-meters). Typically the drive for such a device comprises a variable speed AC or DC motor driving a grinding mill through a frictional coupling. Heretofore, such frictional couplings have employed pneumatically operated movable members on the motor output shaft to frictionally engage an annular driven surface on the grinding mill power input shaft. Couplings of this type are known to employ a plurality of circumferentially disposed radially movable arcuate elements having friction pads thereon and operable upon pneumatic inflation of an inflatable ring to cause the friction pads on the radially movable elements to engage the annular driven surface and connect the motor shaft to the input shaft of the grinding mill.

In the aforesaid types of pneumatically operated drive coupling for a grinding mill, the radially movable arcuate elements employ an axial passage therethrough which has received therethrough a torque bar having its ends anchored in annular plates attached to the motor power output shaft for rotation therewith. The axial passages through the radially movable arcuate element generally have a rectangular cross section which is elongated in the radial direction preventing movement in the circumferential direction but permit movement in the radial direction of the arcuate elements. Additional axial passages are provided to the arcuate elements to provide for air circulation and cooling. However, in service, structural failure of the radially extending wall portion of the axial passage for the torque bar through the arcuate element has experienced structural failure upon sudden torque increases in the coupling due to abnormal conditions in the grinding mill. Furthermore, upon the occurrence of such abnormal conditions in the grinding mill and sudden increases in the torque required to operate the mill, the addition torque loading has resulted in failures of the drive motor.

Thus, it has been desired to provide a way or means of protecting a drive motor for an industrial grinding mill from failure due to sudden torque increases; and, also to prevent structural failure of the arcuate elements in the pneumatically operated friction coupling between the motor and the grinding mill. Furthermore, the design of the elements to increase their resistance to structural failure would also be prohibitively costly. Additionally, adding structural material to the radially movable arcuate elements to provide the desired increased structural strength would add mass to the rotating elements and increase rotary inertial forces.

SUMMARY

The present disclosure describes a solution to the above described problem of increasing the structural rigidity of the arcuate elements in pneumatically operated friction coupling for an industrial grinding mill drive without requiring the addition of mass to the rotating arcuate element by providing axially extending generally U-shaped undercuts to the radially inward corners of the rectangular axial passage through the radially removable arcuate elements through which the torque bars are received. In addition, the present disclosure provides for protecting the drive motor from sudden torque increase due to abnormal conditions in the grinding mill. Shaft speed sensors are provided in the motor output shaft and the input shaft to the grinding mill, or, in other words, on the input and the output side of the pneumatically operated coupling and the sensors provide signals indicative of the associated shaft. A comparator is operative upon receiving signals from the sensors indicative of a predetermined speed differential to send a signal to a solenoid operated valve which exhausts the pneumatic pressure maintaining the frictional coupling in engagement thereby immediately releasing coupling of the motor shaft from the grinding mill shaft.

BRIEF DESCRIPTION OF THE DRAWINGS

FIG. 4 is an enlarged perspective view of one of the radially movable arcuate elements for the assembly of FIG. 2; and, FIG. 5 is an enlarged view of the broken away portion of FIG. 3.

DETAILED DESCRIPTION

Figure 1:
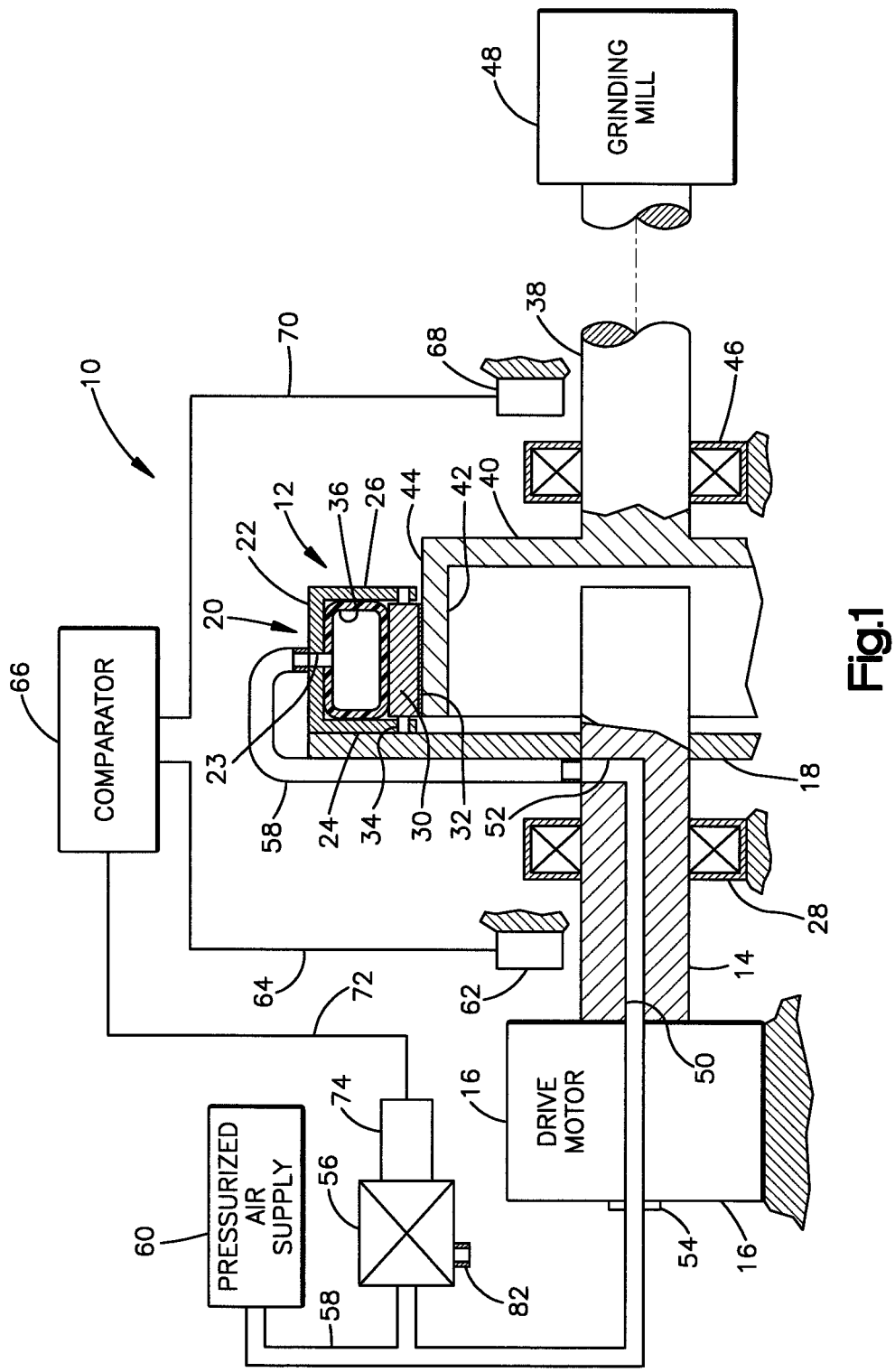
FIG. 1 is a schematic of a drive system for an industrial grinding mill.
Figure 2:
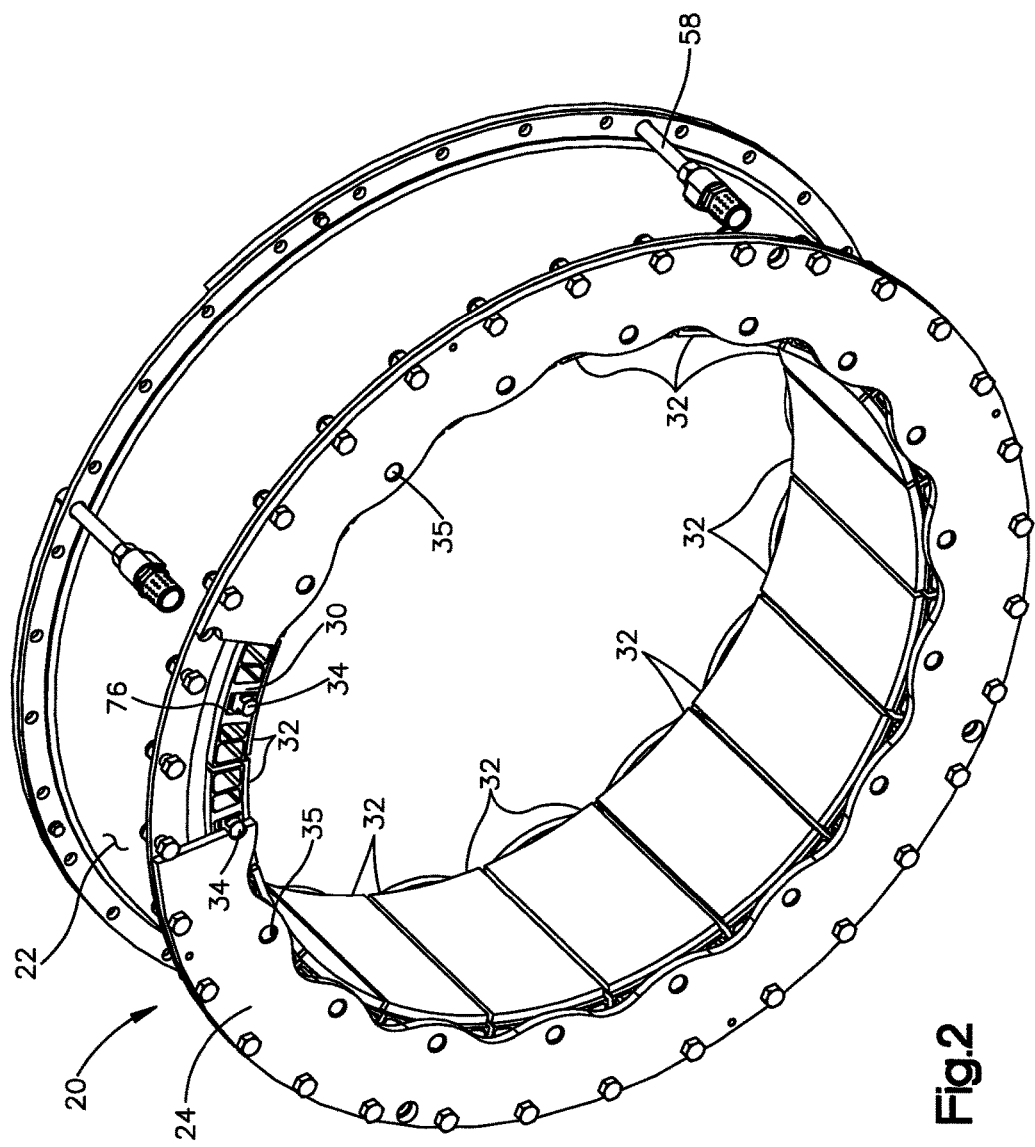
FIG. 2 is a perspective view of a pneumatically operated frictional coupling assembly for attachment to the motor output shaft of the system of FIG. 1 with portions thereof broken to show a torque bar in position in the radially moveably arcuate elements.
Figure 3:
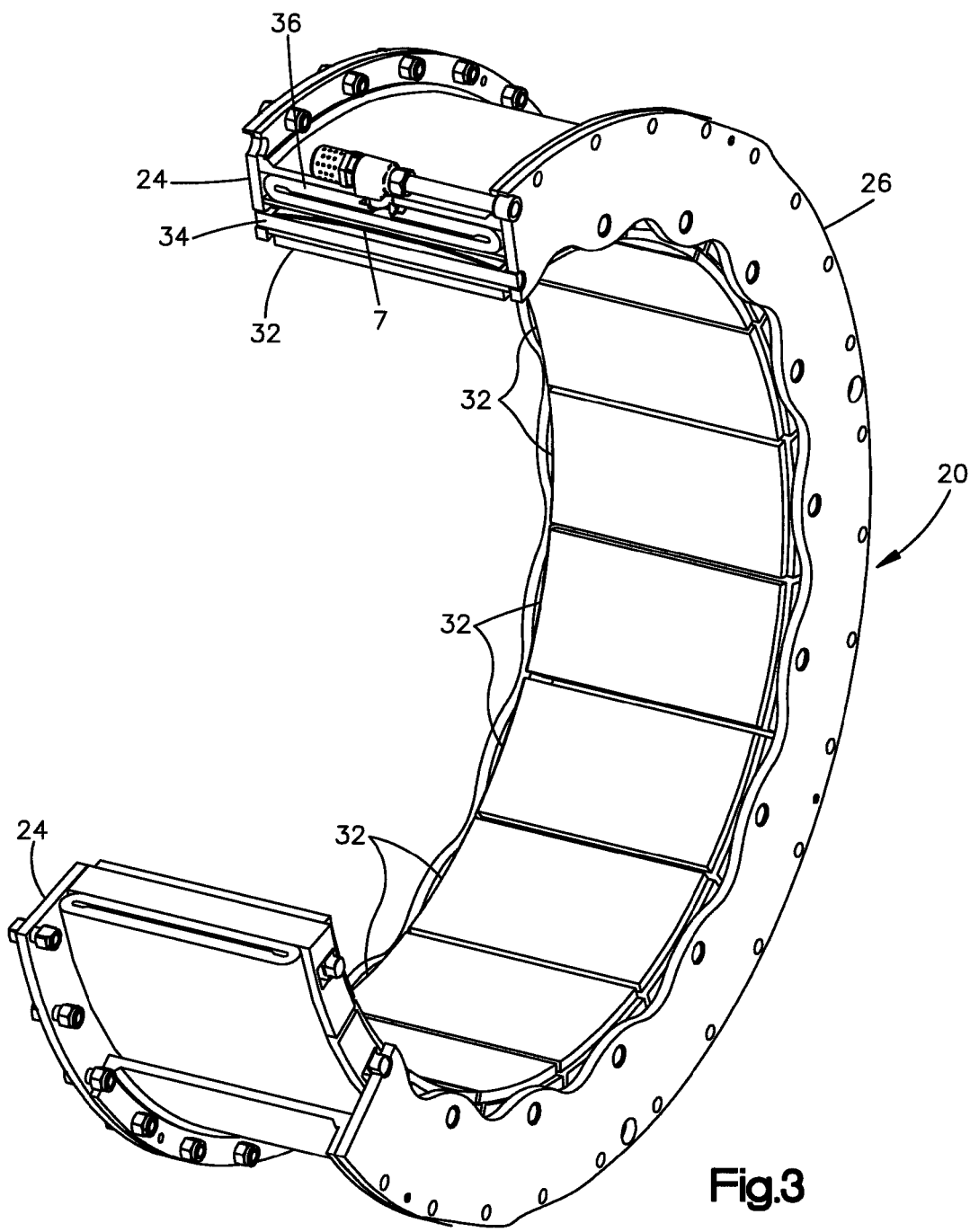
FIG. 3 is a broken array view of the assembly of FIG. 2 showing the pneumatically inflatable operator.

Referring to FIGS. 1-5, an industrial drive for a grinding mill is indicated generally at 10 and includes a pneumatically operated friction coupling 12 attached to the output shaft 14 of drive motor 16 by means of an annular flange or disk 18 attached to the shaft 14. The motor output shaft 14 is supported by stationary pillow block bearings 28 disposed adjacent the coupling 12.

The coupling 12 has an assembly 20 which includes an annular cylindrical outer plate or ring 22 having attached thereto axially spaced radially inwardly extending ring plates 24, 26 which have retained therein a plurality of radially movable arcuately configured elements 30 each having a friction pad 32 attached thereto on the radially inward surface thereof. Each of the arcuate elements 30 have an axially extending passage 76 therethrough which passage has a generally rectangular configuration elongated in the radial direction. Each of the axial passages 76 through the arcuate elements 30, has a torque bar 34 received axially therethrough which is configured to closely interfit the sides of the passage 76 to prevent relative movement therebetween in the circumferential direction but to permit sliding movement of the arcuate element with respect to the torque bar 34 in the radial direction. Each of the torque bars 34 has its ends received in apertures 35 provided in the ring plates 24, 26, thereby preventing movement of the torque bar with respect to the ring plates 24, 26.

The grinding mill 48 has an input shaft 38 which is supported by stationary pillow block bearing 46; and, the shaft 38 has a radially outwardly extending flange or annular plate 40 having a cylindrical outer ring flange 42 extending axially coincident with the friction pads 32 of the assembly 20. The ring flange 42 has an annular friction surface 44 provided about the outer periphery thereof, which, it will be understood, is engageable by the friction pads 32 on arcuate elements 30. The coupling 12 is operated by a pneumatic inflatable member or ring 36 disposed circumferentially about the arcuate elements 30 within the ring 22 and has an inlet 23 provided through ring 22 for introduction of pressurized air therein.

The motor output shaft 14 and the drive motor have a passage 50 provided centrally therethrough and communicating with a cross passage 52 which is connected to a conduit 58 having an opposite end thereof connected to the passage 23. A rotary coupling 54 connects passage 50 through a conduit 58 to a source of pressurized air denoted by reference numeral 60. The conduit 58 is also connected to the inlet of a valve 56.

On operation, the inflatable 36 is inflated with air pressure from supply 60, which, in the present practice, is in the range of 75 to 125 pounds per square inch (517 to 862 kPa) for effecting movement of the arcuate elements 30 to cause friction pads 32 to engage the annular driven surface 44 and effect driving of the shaft 38.

A shaft speed sensor 62 is disposed adjacent the motor output shaft 14; and, a second shaft speed sensor 68 is disposed adjacent he driven shaft 38 to the grinding mill. Sensors 62, 68 are connected respectfully along line 64, 70 to the input of a comparator 66 which has its output connected along line 72 to a solenoid 74 for operating the valve 56. Upon the comparator 66 sensing a predetermined speed differential from the input signals of the sensors 62, 68 which in the present practice is set at in excess of 5% of the shaft speed, the comparator causes a solenoid operator 74 to open valve 56 and discharge the air pressure in conduit 58 to the atmosphere through exhaust port 82. Referring to FIG. 5, a return spring 78 is provided between the torque bars 34 and the radially outer wall inner surface of the passage 76 in the arcuate members 30 outwardly to detract the friction pads 32 from the annular surface 44.

Referring to FIG. 4, the axial passages 76 through the torque bars 30 each have a radially extending generally U-shaped undercut extending radially inwardly provided in the radially inward corners thereof as denoted by reference numeral 80 to provide stress relief for the circumferential loading of the side walls of the passage 76 by the torque bars. Thus, the torque carrying capacity of the existing arcuate element is significantly increased without the need for additional material which would increase the rotating mass of the assembly.

The present disclosure thus describes a drive coupling for an industrial drive particularly of the type employed for grinding mills having a pneumatically operated frictional coupling. Speed sensors on the input side and output side thereof provide signals to a comparator indicative of the speed of the input and output shaft of the coupling. The comparator is responsive to sensing a speed differential in excess of 5% to send a signal to a solenoid to operate a dump valve to discharge air pressure from a pneumatic inflating element for immediately disengaging the drive coupling thereby protecting the drive motor from damage due to sudden torque increase. Each of the radially movable arcuate elements from the drive coupling has a torque bar received axially therethrough for circumferentially restraining the torque bar and permitting radial movement thereof for frictional engagement with the output shaft of the coupling. The rectangular cross section passages for the torque bar have undercuts provided in the radially inward corners thereof to provide stress relief and increase the torque bearing capacity of the arcuate element without the need for increase in the amount of structure in the arcuate element. The coupling of the present disclosure thus is capable of having significant amount of additional torque without redesign or costly changes and is also capable of protecting the drive motor from sudden torque increases by rapid decoupling of the motor from the output shaft.

The invention claimed is:

1. A releasable shaft coupling for an industrial drive comprising:
   (a) a rotatable input shaft with an annular member connected thereto, the annular member having disposed thereon a plurality of circumferentially disposed radially movable elements having driving friction surfaces thereon;
   (b) an inflatable operable upon fluid pressurization to effect radial movement of the radially movable elements;
   (c) a rotatable output shaft having annular driven friction surfaces thereon disposed about the driving friction surfaces;
   (d) a first speed sensor disposed for sensing the rotational speed of the input shaft and operable to provide electrical signal indicative thereof;
   (e) a second speed sensor disposed for sensing the rotational speed of the output shaft and provide an electrical signal indicative thereof;
   (f) a fluid pressure conduit connected to the inflatable and operable upon connection to a source of pressurized fluid to effect inflation of the inflatable, wherein, upon inflation thereof the radially movable elements are moved to force the driving friction surfaces into contact with the driven friction surfaces to effect rotary coupling of the input shaft to the output shaft;
   (g) an electrically actuated valve connected to the conduit and operable upon energization to effect depressurization of the inflatable;
   (h) a comparator connected for receiving the first and second sensor signals and operable upon detecting a predetermined speed difference of the input and output shaft to provide an output signal effecting energization of the valve and release of the coupling; and,
   (i) wherein the radially moveable elements have an arcuate configuration with an axially extending aperture therethrough and a torque bar extending through the aperture, the aperture having a generally rectangular cross-section with the longer sides thereof extending in the radial direction for permitting radial movement of the associated element, wherein radially inner corners of the aperture have an undercut formed therein.

2. The coupling of claim 1, wherein the electrically operated valve comprises a solenoid operated valve.

3. The coupling of claim 1, wherein the undercut is generally U-shaped in cross-section.

4. The coupling of claim 1, wherein the conduit includes a central bore in the input shaft.

5. A drive system for an industrial grinding mill comprising:
   (a) a motor having a shaft with an annular member connected thereto, the annular member having a plurality of circumferentially disposed radially movable elements disposed thereon having driving friction surfaces thereon;
   (b) an inflatable operable upon fluid pressurization to effect radial movement of the radially movable elements;
   (c) a rotatable driven shaft having annular driven friction surfaces thereon disposed about the driving friction surfaces;

(d) a fluid pressure conduit connected to the inflatable and operable upon connection to a source of fluid pressure to effect inflation of the inflatable, wherein upon inflation thereof the radially movable elements are moved to force the driving friction surfaces into contact with the driven friction surfaces to effect rotary coupling of the motor shaft with the driven shaft for transmitting power to the speed reducing transmission;

(e) a first speed sensor disposed to sense rotational speed of the driving shaft and operable to provide an electrical signal indicative thereof;

(f) a second speed sensor disposed to sense rotational speed of the driven shaft and operable to provide an electrical signal indicative thereof;

(g) an electrically actuated valve connected to the conduit and operable upon energization to effect depressurization of the inflatable;

(h) a comparator connected for receiving the first and second sensor signals and operable upon detecting a predetermined speed difference of the driving and driven shaft to provide an output signal effecting energization of the valve and release of the coupling; and, (i) wherein the radially movable elements have an arcuate configuration with an axially extending aperture therethrough and a torque bar extending through the aperture, the aperture having a generally rectangular cross-section with the longer sides thereof extending in the radial direction for permitting radial movement of the associated element, wherein radially inner corners of the aperture have an undercut formed therein.

6. The system of claim 5, wherein the conduit includes a central bore in the motor driving shaft.

7. The system of claim 1, wherein the undercut is generally U-shaped in cross-section.

8. The coupling of claim 1, wherein the predetermined speed difference is in excess of five percent (5%).

* * * * *